United States Patent [19]

Starek et al.

[11] Patent Number: 4,635,283
[45] Date of Patent: Jan. 6, 1987

[54] MOUNTING FOR THE ROTARY ANODE OF AN X-RAY TUBE

[75] Inventors: Frantisek Starek, Brno; Vilem Machacek, Rajhrad; Pavel Manhalter, Brno, all of Czechoslovakia

[73] Assignee: ZVL Vyzkumny ustav pro valiva loziska Brno, Brno, Czechoslovakia

[21] Appl. No.: 593,622

[22] Filed: Mar. 26, 1984

[30] Foreign Application Priority Data

Mar. 31, 1983 [CS] Czechoslovakia ............ 2251-83

[51] Int. Cl.$^4$ ............................................. H01J 35/26
[52] U.S. Cl. ..................................... 378/132; 378/125
[58] Field of Search ............... 378/125, 131, 132, 133, 378/127

[56] References Cited

U.S. PATENT DOCUMENTS

| 2,885,583 | 5/1959 | Zunick et al. | 378/132 |
| 3,634,870 | 1/1972 | Kessler | 378/132 |
| 3,819,968 | 6/1974 | Haberrecker et al. | 378/132 |

Primary Examiner—Carolyn E. Fields

[57] ABSTRACT

Mounting for a rotary anode in an x-ray tube. A radially outer rotor sleeve, constituting the rotor of an electric motor, has an anode disc connected centrally thereof. A radially inner, supporting sleeve is telescoped within the rotor sleeve and is spaced radially therefrom. A central shaft extending longitudinally of the rotor sleeve and a further sleeve intermediate between the radially inner and outer sleeves has an anti-friction bearing with inner and outer races mounted on its respective ends, the inner race of each bearing being connected to the shaft and the outer race of each bearing being connected to the intermediate sleeve which is disposed coaxially of the rotor sleeve, the intermediate sleeve, and the shaft, and between and spaced from the shaft and the supporting sleeve. The intermediate sleeve is prevented from axial movement with respect to the supporting sleeve. The inner race of the bearing nearer the anode and the end of the shaft at such location are connected to the rotor sleeve by a connecting element. Resilient means are mounted between the respective ends of the intermediate sleeve and the supporting sleeve in alignment with the bearings. In the radially outer anode sleeve there is disposed a centering sleeve the end portion thereof close to the anode disc having the shape of a collet. The connecting element is fixed in the collet with an interference fit, the end face of the collet being spaced from the end portion of the radially outer rotor sleeve which is nearer the anode disc.

2 Claims, 3 Drawing Figures

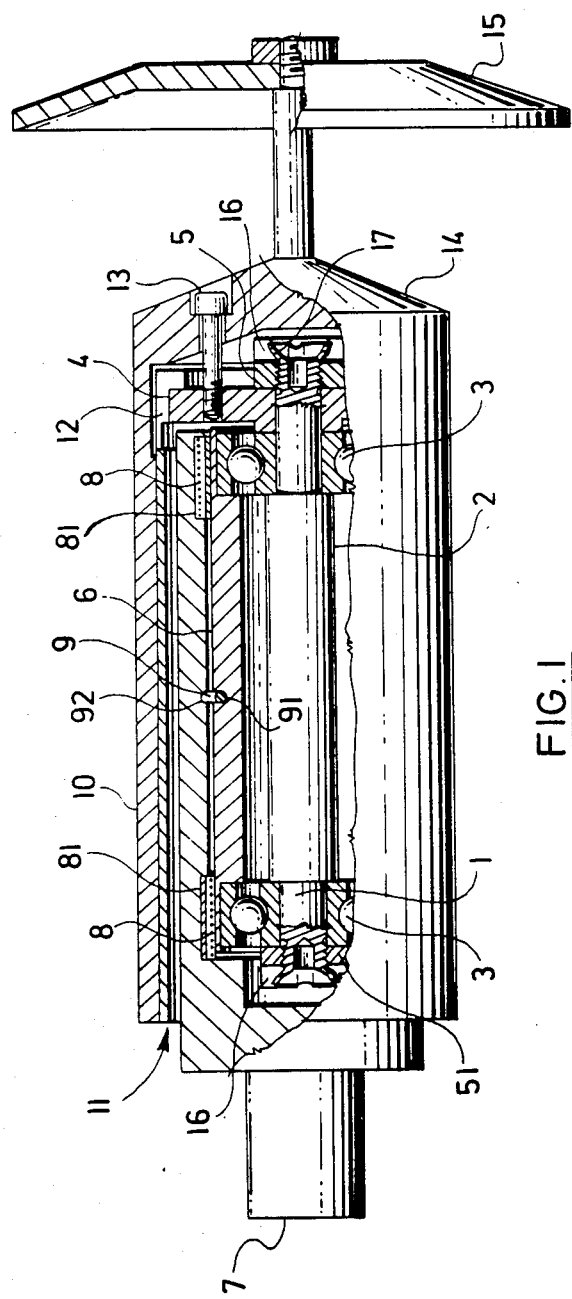
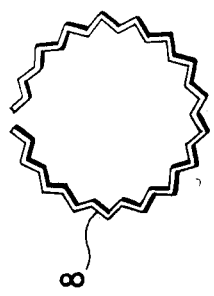

MOUNTING FOR THE ROTARY ANODE OF AN X-RAY TUBE

This invention relates to a mounting for a rotary anode of an x-ray tube.

For the mounting of the rotary anode of an x-ray tube there have been usually employed a pair of special anti-friction bearings, the inner races of the bearings being mounted on a shaft connected with the anode disc, and the outer races of the bearings being located in a sleeve constituting the anode holder. This mounting design, however, is not entirely satisfactory due to the high requirements on performance accuracy of the rotary anode, and, further, especially owing to a wide range of operating temperature conditions. Such prior mounting means do not provide adequate vibration damping and thus noise reduction; the bearing life of the mounting determines the life of the expensive x-ray tube; prior art mountings for rotary anodes of x-ray tubes operate at limited speeds, thus limiting the performance of the x-ray tube itself.

The aforementioned limitations are removed to a considerable degree through the mounting of the rotary components of the anode in x-ray tubes according to the invention. The mounting of the invention includes a pair of anti-friction bearings, the outer races of which are located within an anode holder in form of a radially outer sleeve. The inner races of the bearings are attached to the stepped ends of a central shaft connected with the anode disc. The outer races of the anti-friction bearings are fixed in a supporting radially inner sleeve mounted within the anode holder by means of corrugated elastic rings which are inserted into grooves provided in the bore of the anode holder opposite to the outer races of the bearings. The supporting sleeve is provided with an elastic snap ring engaging a groove provided on the inner circumference in the central portion of the supporting sleeve as well as an opposite mating groove created within the orifice of an intermediate sleeve acting as an anode holder. The internal walls of the corrugated elastic rings are in contact with the external surface of the supporting sleeve in at least three straight lines. The external walls of the elastic rings are also in contact with the surface of the grooves within the orifice of the anode holder in at least three straight lines, which straight lines are located in planes different from the planes of contact of the internal walls of the elastic rings relative to the external surface of the supporting sleeve.

Radially outwardly of the intermediate sleeve space within the radially outer sleeve, there is inserted a centering sleeve assuming at the side of the anode disc the shape of a collet. The face of this collet does not abut on the face wall of the anode jacket, but an inner annular surface of the collet engages an outer annular surface of a member which serves to connect the central inner shaft and the radially outer sleeve with an interference fit. Such connecting element is attached to the end of the radially outer sleeve adjacent the anode disc by machine screws. The connecting element is rigidly mounted on a shoulder on the central shaft between the face of the inner race of the anti-friction bearing and the face of the securing element, on which, along with the other securing element on the opposite end of the shaft, there are provided locking means in the form of nuts screw threaded on the threaded opposite end of the central shaft, such nuts being locked to the shaft by the flaring of the outer ends of the shafts at localized points into grooves in the outer ends of the nuts.

The mounting according to the invention permits a higher performance of the x-ray tube with a considerable reduction of the vibration of the optical focus. The heat flow from the anode disc into the rolling bearings is substantially reduced by fixing the connecting element of the shaft within the collet, the collet not being directly connnected with the hot anode jacket. The corrugated elastic rings act as thermal insulation for the outer races of the anti-friction bearings, thus substantially reducing the temperature gradient in said bearings.

The invention will be more fully understood upon consideration of the accompanying drawings, in which:

FIG. 1 is a view partially in longitudinal axial section and partially in side elevation of the rotary anode mounting of the invention;

FIG. 2 is a view in end elevation of an elastic ring employed in such mounting.

Figure 3:
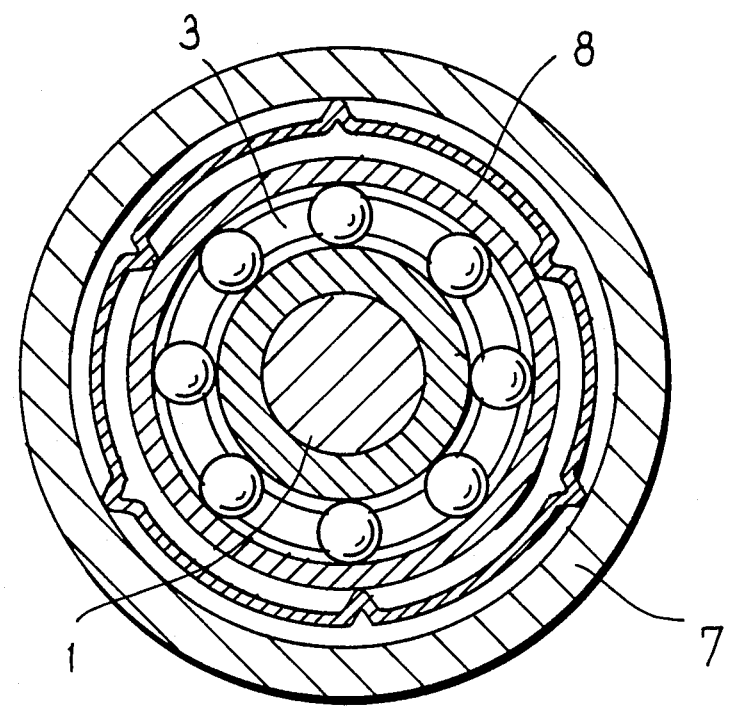
FIG. 3 is a view in end elevation of the means which lockingly secures the connecting element to an end of the central shaft of the mounting.

It is to be understood that, in accordance with the prior art, the structure shown in FIG. 1 is sealed into an evacuated glass envelope, the motor which rotates the anode having a rotor disposed within the envelope and connected to the anode, the motor having a stator disposed outside the glass envelope of the x-ray tube and cooperating with the rotor by a magnetic induction field. For simplicity of illustration, none of the glass envelope, the stator of the motor, and the cathode of the x-ray tube is shown in the drawings.

Turning to FIG. 1 of the drawings, a rotary anode 10 in the form of a disc is supported on the outer free end of a shaft 11 which forms a central extension of a rotor in the form of a radially outer rotor sleeve generally designated 12. The rotary mounting for the anode is mounted upon an external support 14, the upper end of support 14 extending through the glass envelope (not shown) of the x-ray tube and being sealed thereto. The anode support of the anode mounting of the invention is designated generally 15, the left hand of support 15 being of reduced diameter, as shown at 16, and being rigidly received and supported by the supporting means 14.

The right hand portion of the anode support 15 is in the form of a radially intermediate sleeve 17 having a circular cylindrical outer surface and a generally circular cylindrical bore therewithin coaxial of such outer surface. As shown, the outer rotor sleeve 12 has a circular cylindrical sleeve portion 19 which is open ended at the left and extends to the right to a frusto-conical part 20 which connects the shaft 11 bearing the anode 10 to the right hand end of the sleeve portion 19 of the rotor 12. The sleeve 19 of the rotor 12 is coaxial of the sleeve part 17 of the anode support 15 and is radially spaced outwardly therefrom. The rotor sleeve 12 is rotatably supported by the member 15 in the following manner.

Disposed within the radially intermediate sleeve portion 17 of the member 15 is a bearing supporting a radially inner tubular member or sleeve 21 having annular recesses or seats at its opposite ends accurately receiving the outer races of the right hand ball bearing 22 and the left hand ball bearing 24. The sleeve 21 has an outer diameter somewhat less than the inner diameter of the sleeve part 17 of member 15, as shown. The sleeve 21 is accurately located in an axial direction relative to the sleeve portion 17 of member 15 by a snap ring 27 which is partially received within an annular groove 25 in the inner wall of sleeve 17 and an annular groove 26, confronting groove 25, in the outer surface of the sleeve 21.

A central shaft 29 spaced inwardly from the inner wall of sleeve 21 and disposed coaxially thereof has a shouldered seat 30 in each end thereof, seat 30 receiving the inner race of the respective bearing 22, 24.

An annular groove or seat 31 is provided in the inner wall at each end of the sleeve portion 17 of member 15, each of grooves 31 receiving a respective corrugated elastic ring 32 which surrounds the respective end of the sleeve 21. Elastic rings 32 are made of sheet or foil metal. The internal walls of said elastic rings 32 are in contact with the external surface of the third, intermediate sleeve 21 along at least three straight lines and the external walls of said elastic rings 32 are in contact with the peripheral surface of the grooves 31 within the bore of the sleeve 17 of member 15 also in at least three straight lines, which straight lines are located in planes different from the contact planes of the internal walls of the elastic rings 32 relative to the external surface of the supporting sleeve 21.

Radially outwardly of the sleeve portion 17 of member 15 and within the cavity of the sleeve 19 of rotor 12 there is inserted a centering sleeve 33.

An annular member 34 connects the central shaft 29 with the right hand end of the centering sleeve 33, member 34 in turn being connected to the portion 20 of the rotor 12. Member 34 is secured to the opposite ends of the central shaft 29 by similar means. Thus the outer ends of shaft 29 are externally threaded, and each is provided with a counterbore whereby to provide a thin-walled section thereof. A nut 35 is screwed onto the right hand end of shaft 29, and a nut 35' is screwed onto the left hand end of such shaft. Such nuts are castellated, that is, each is provided with a plurality of radially extending grooves 36 in its outer face. After the nuts 35 and 35' have been forcibly screwed onto the shaft 29 into a final position thereof, the thin outer wall section at the ends of the shaft 29 are then deformed radially outwardly as shown at 37 at the right in FIG. 1, whereby to lock the nuts upon the shaft by expanding the ends of the shaft into spaces 36, 36'.

The right hand end of the centering sleeve 33 is formed in the shape of a collet 41 having an axially extending short sleeve portion and a radially inwardly extending annular flange. The right hand end surface of collet 41 is spaced from the inner surface of portion 20 of the rotor; the peripheral outer surface of connecting element 34 is received within the collet 41 with an interference fit. The connecting element 34 is rigidly mounted upon the reduced diameter right hand end portion of shaft 29 between the right hand outer end face of the inner race of bearing 22 and the inner face of the nut 35. The connecting element 34 is secured to the portion 20 of rotor 12 by a plurality of machine screws 39 which extend through openings in member 20 and are screwed into connecting element 34 as shown.

Rotor 12 is made up of sleeve 19 and the centering sleeve 33 within it, the rotor being ferromagnetic and cooperating with the magnetic field generated by the stator (not shown) disposed outside the space of the x-ray tube. Mechanical load resulting from the overhung mounted anode disc 10 is transferred from the sleeve portion 19 of the rotor by means of the machine screws 39 and the connecting element 34 onto the central shaft 29. The collet 41 of the centering sleeve 33 provides for the concentric positioning of the sleeve 19 of the rotor relative to the connecting element 34 and thus also to the shaft 29 without undesirable backlash. Dynamic forces generated during rotation of unbalanced masses are damped by means of the corrugated elastic rings 32, by which, at the same time, the temperature gradient in the bearings 22 and 24 is reduced.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. A mounting for the rotary anode of an x-ray tube, comprising
    a first, radially outer sleeve forming the rotor of an electric motor,
    a rotary anode of an x-ray tube attached centrally to one end of the rotor,
    means for supporting the rotor and the anode comprising
    a second, radially intermediate anode-supporting sleeve telescoped within the first, outer sleeve and spaced radially therefrom, the second sleeve being disposed coaxially of the first sleeve and having
    a supporting means attached to the end thereof which is remote from the anode,
    a central shaft extending longitudinally of the first sleeve and the second sleeve coaxially of said sleeves,
    a third, intermediate sleeve extending longitudinally of the shaft and other sleeves, and disposed between the shaft and the second sleeve and spaced radially from both the shaft and the second intermediate sleeve,
    an antifriction bearing at each end of the shaft, each of the bearings having
    an inner race and
    an outer race, the inner race of each bearing being mounted upon the shaft at respective opposite ends thereof, the outer race of each of the bearings being telescoped within and attached to the respective ends of the third intermediate sleeve,
    means for preventing the third intermediate sleeve from appreciable axial movement with respect to the second supporting sleeve,
    an annular connecting member extending between and connecting the first, rotor sleeve and the inner race of one of the bearings and the shaft at such bearing, and
    resilient annular means disposed between the second, supporting sleeve and the third, intermediate sleeve in transverse alignment with each of the anti-friction bearings, and
    a centering sleeve mounted within, and accurately engaging the inner wall of the first, rotor sleeve, the centering sleeve at the end thereof adjacent the anode having the shape of a collet, the end wall of which is spaced from the inner wall of the first rotor sleeve which is adjacent the anode, the outer peripheral surface of the member connecting the rotor sleeve with the inner race of the bearing adjacent the anode, and the end of the central shaft at such location having an interference fit with the circular inner peripheral surface of the collet.

2. A mounting as claimed in claim 1, wherein
    the connecting member is connected to the end of the rotor sleeve adjacent the anode by means of machine screws.

* * * * *